United States Patent [19]

Henley

[11] Patent Number: 5,615,039
[45] Date of Patent: Mar. 25, 1997

[54] ELECTRO-OPTICAL ELEMENT AND ITS MANUFACTURING METHOD

[75] Inventor: Francois J. Henley, Los Gatos, Calif.

[73] Assignee: Photon Dynamics, Inc., Milpitas, Calif.

[21] Appl. No.: 757,454

[22] Filed: Sep. 10, 1991

[51] Int. Cl.⁶ ............................................. G02F 1/03
[52] U.S. Cl. ................................ 359/257; 359/267
[58] Field of Search ............................... 359/226, 227, 359/257, 267, 275

[56] References Cited

U.S. PATENT DOCUMENTS

| | | | |
|---|---|---|---|
| 4,270,847 | 6/1981 | Meyer | 359/257 |
| 4,500,174 | 2/1985 | Conner | 359/267 |
| 4,761,061 | 8/1988 | Nishiyama et al. | 359/265 |
| 5,170,127 | 12/1992 | Henley | 324/658 |

*Primary Examiner*—Georgia Y. Epps
*Assistant Examiner*—Thomas Robbins
*Attorney, Agent, or Firm*—Townsend and Townsend and Crew LLP

[57] ABSTRACT

The present invention provides an electro-optical element and its manufacturing method ideal for use in defect inspection devices for liquid crystal display substrates used in liquid crystal display panels. The electro-optical element of this invention possesses an electro-optical element, dielectric reflective film, transparent electrode, and transparent supporting substrate. These are united together by adhering the dielectric reflective film and transparent electrode edge to the electro-optical element. The electro-optical element is manufactured by consecutively affixing the transparent sheet with the transparent electrode, the electro-optical element, and transparent film with the dielectric reflective film to the transparent supporting substrate. Since the electro-optical element of this invention is equipped with a transparent electrode and dielectric reflective film, the optical properties of the electro-optical element change by the transmission of electricity to the transparent electrode and inspected body and creation of an electric field, and it can be used in defect inspection of an inspected body by measuring those changes.

37 Claims, 7 Drawing Sheets

ELECTRO-OPTICAL ELEMENT AND ITS MANUFACTURING METHOD

BACKGROUND OF THE INVENTION

When making liquid crystal display panels having a large area and high pixel density such as are applicable to liquid crystal televisions, etc., it is desirable to test the active matrix liquid crystal display substrate to ensure proper assembly of picture element electrodes (installed for every picture element arranged in rows), gate wiring, source wiring, and thin-film transistors installed in common with each picture element electrode. Currently, testing of comparatively small active matrix liquid crystal displays is possible. After manufacturing the active matrix liquid crystal display substrate, a transparent substrate is placed on top of the active matrix liquid crystal display substrate with a spacer in between the transparent substrate and the active matrix liquid crystal display substrate. The liquid crystal display panel is then manufactured by inserting liquid crystal in the space formed between the active matrix liquid crystal display substrate and the transparent substrate.

In liquid crystal televisions currently manufactured with this technology, the number of pixel elements reaches 250,000 to 500,000 and in some, the number of pixel elements is over 1,000,000.

Manufacturing is done using various thin film forming processes in a clean room, controlled so that there will be no dust. However, when the pixel elements and the conductive line widths are extremely small, the existence of a small amount of micro-dust in the manufacturing environment is directly linked to open defects and short defects in the picture element electrodes, gate wiring, and source wiring. Presently, up to about ten of this type of defect is permissible in an active matrix liquid crystal display substrate. If the number of defects is more than that, the product is considered of poor quality and is discarded.

With present manufacturing technology, the poor quality rate is remarkably high in liquid crystal display panels with a large number of picture elements. Inability to reduce the number of these defects to under the permissible limit has resulted in a high price for large liquid crystal panels.

Testing active matrix liquid crystal display substrates using a prober is well-known as a method for inspecting active matrix liquid crystal display substrates once the active matrix liquid crystal display substrate is completed. Because of the large number of pixel elements on the active matrix liquid crystal display substrate, it takes too much time to test using probing techniques, which are not practical.

For this reason, when manufacturing liquid crystal display panels using active matrix liquid crystal display substrates, inspection or testing is not conducted on the active matrix liquid crystal display substrate production line. Whether or not each pixel actually works is checked visually by transmitting electricity to the liquid crystal display panel after manufacturing has been completed. Even if defects are discovered at this point in time, it is difficult to repair or remedy the defect. This has become a large factor in the very poor yield of active matrix liquid crystal display substrates which are scrapped due to defects.

SUMMARY OF THE INVENTION

The present invention is a device for testing active matrix liquid crystal display substrates. The testing device is constructed so that an electro-optical element in which optical properties change when an electric field is impressed is placed adjacent to the active matrix liquid crystal display substrate to be tested. A voltage is then applied to several electrode elements on the active matrix liquid crystal display substrate, and an electric field for each electrode element in the electro-optical element is activated by these many electrode elements. Microscopic optical changes in the electro-optical element are then read by a camera and defects in the elements on the active matrix liquid crystal display substrate are detected.

It is object of the present invention to provide a superior test methodology for detecting defects in active matrix liquid crystal display substrates accurately and swiftly before assembly of the liquid crystal panel.

DESCRIPTION OF AN EXEMPLARY PREFERRED EMBODIMENT

The invention includes an electro-optical element in which the optical properties change when an electric field is impressed thereon, a dielectric reflective film formed on the bottom of the electro-optical element, and a transparent electrode and transparent supporting substrate stacked on the top of the electro-optical element to enable testing of active matrix liquid crystal display substrates.

The edge of the dielectric reflective film and edge of the electrode in the electro-optical element protrudes from the edge around the electro-optical element and is fixed to the end of the transparent supporting substrate by an adhesive layer to keep it in place.

The electro-optical assembly is comprised of a transparent sheet with a transparent electrode, the electro-optical element, and a transparent film with a dielectric reflective film stacked on one side of a transparent supporting substrate. The transparent film used is larger than the transparent supporting substrate and is supported horizontally. The electro-optical element is adhered to the transparent sheet by pressing the transparent supporting substrate, transparent sheet with the electro-optical element in the center thereof. An adhesive is then applied to the edges around the electro-optical element. After the adhesive has hardened, the excess transparent film around the electro-optical element is cut off.

The electro-optical element changes in optical properties when an electric field is impressed across it. Consequently, the optical properties of the electro-optical element change due to the electric field generated by each electrode element when this electro-optical element is placed on top of the active matrix liquid crystal display substrate being tested and a voltage potential established between the picture element electrodes on top of the active matrix liquid crystal display substrate and the transparent electrode on the top of the electro-optical element. Therefore, defects in the active matrix liquid crystal display substrate can be detected by observing these optical property changes.

To observe these optical property changes, the dielectric reflective film is irradiated with light through the transparent supporting substrate, transparent electrode, transparent sheet, electro-optical element and transparent film. The light is reflected by the dielectric reflective film, the reflected light passing through the transparent film, electro-optical element, transparent sheet, transparent electrode, and transparent supporting substrate and is observed. Defects in the active matrix liquid crystal display substrate can be detected by observing changes in the reflected light.

When using a liquid crystal sheet in the electro-optical element, it cannot be exposed to a high-temperature, high-voltage, nor placed in a vacuum atmosphere since liquid crystal is enclosed inside the sheet-shaped housing. Consequently, the formation of a dielectric reflective film or transparent electrode by direct evaporation or CVD methods on the electro-optical element is impossible. It is possible to provide a transparent electrode and dielectric reflective film on the electro-optical element by affixing the electro-optical element to a transparent sheet, forming a transparent electrode, and a transparent film forming a dielectric reflective film for this purpose.

This assembly is advantageous for supporting or moving electro-optical elements since rigidity is given to the electro-optical element by stacking the electro-optical element proper, dielectric reflective film, and transparent electrode on the transparent substrate.

Figure 1:
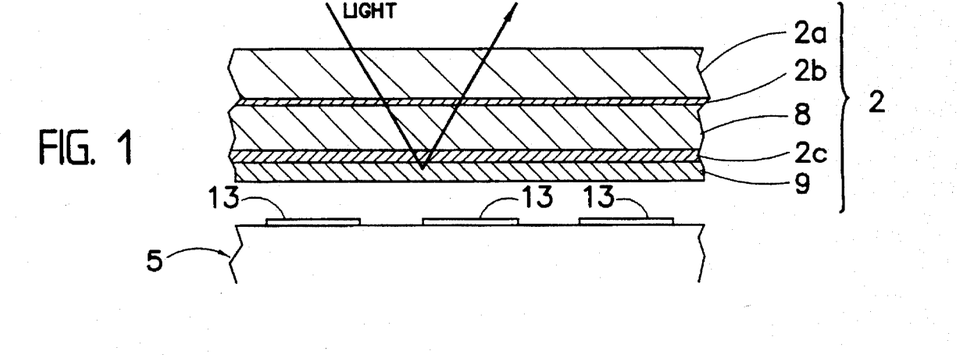
FIG. 1 is a cross-sectional view showing the placement of the electro-optical element of this invention facing the active matrix liquid crystal display substrate under test.

FIG. 1 shows operation of the electro-optical element. Electro-optical element 2 in this example is comprised of a glass plate or other transparent supporting substrate 2a, transparent sheet 2b with a transparent electrode affixed to the bottom thereof, an electro-optical element 8 affixed to the bottom of transparent electrode 2b, transparent film 2c affixed to the bottom of electro-optical element 8, and dielectric reflective film 9 affixed to the bottom of transparent film 2C.

In one preferred embodiment, transparent sheet 2b has a transparent electrode such as ITO film (indium trioxide film) affixed to a polyethylene terephthalate sheet such as Mylar Sheet (product name). Transparent sheet 2b is the transparent sheet that provides the transparent electrode. Because a material which is tough and heat-resistant is desired, material other than a polyethylene terephthalate sheet can be used.

In one preferred embodiment, electro-optical element is comprised of liquid crystal sheets called NCAP (Nematic Curvilinear Aligned Phase), or P-DLC or PN-LC, in which the light transmission changes in accordance with the size of the electric field across the liquid crystal sheet. Similarly, liquid crystals which appear transparent or non-transparent depending on the refractive index of the liquid crystal in the electric field agree or disagree are ideal as the liquid crystal is enclosed within the liquid crystal sheet. Furthermore, as another example of electro-optical element 8, Pockels crystals, in which the magnitude of polarization of the reflected light changes depending on the strength of the electric field applied across it, can also be used.

Electro-optical element 8 used in this invention is not limited to the aforementioned if it is something in which the optical properties such as light transmission change when an electric field is impressed, or the amount of reflected light changes at a predetermined rate, in response to application of an electric field.

Figure 2:
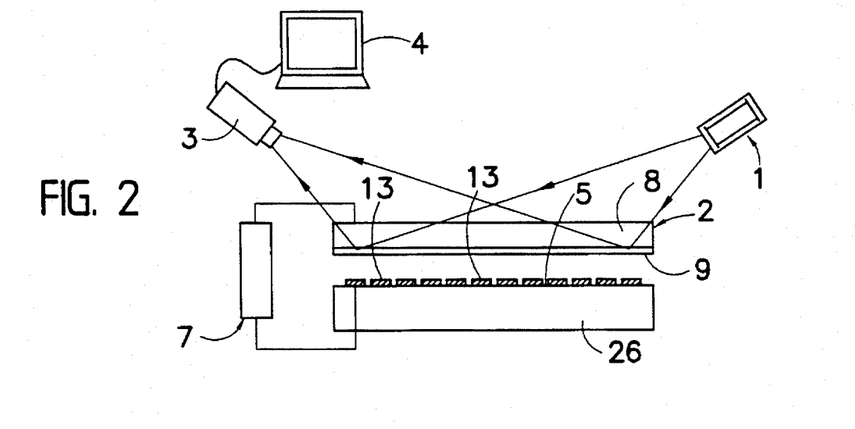
FIG. 2 shows the general structure of the main parts of the test equipment equipped with the electro-optical element in operation.
Figure 4:
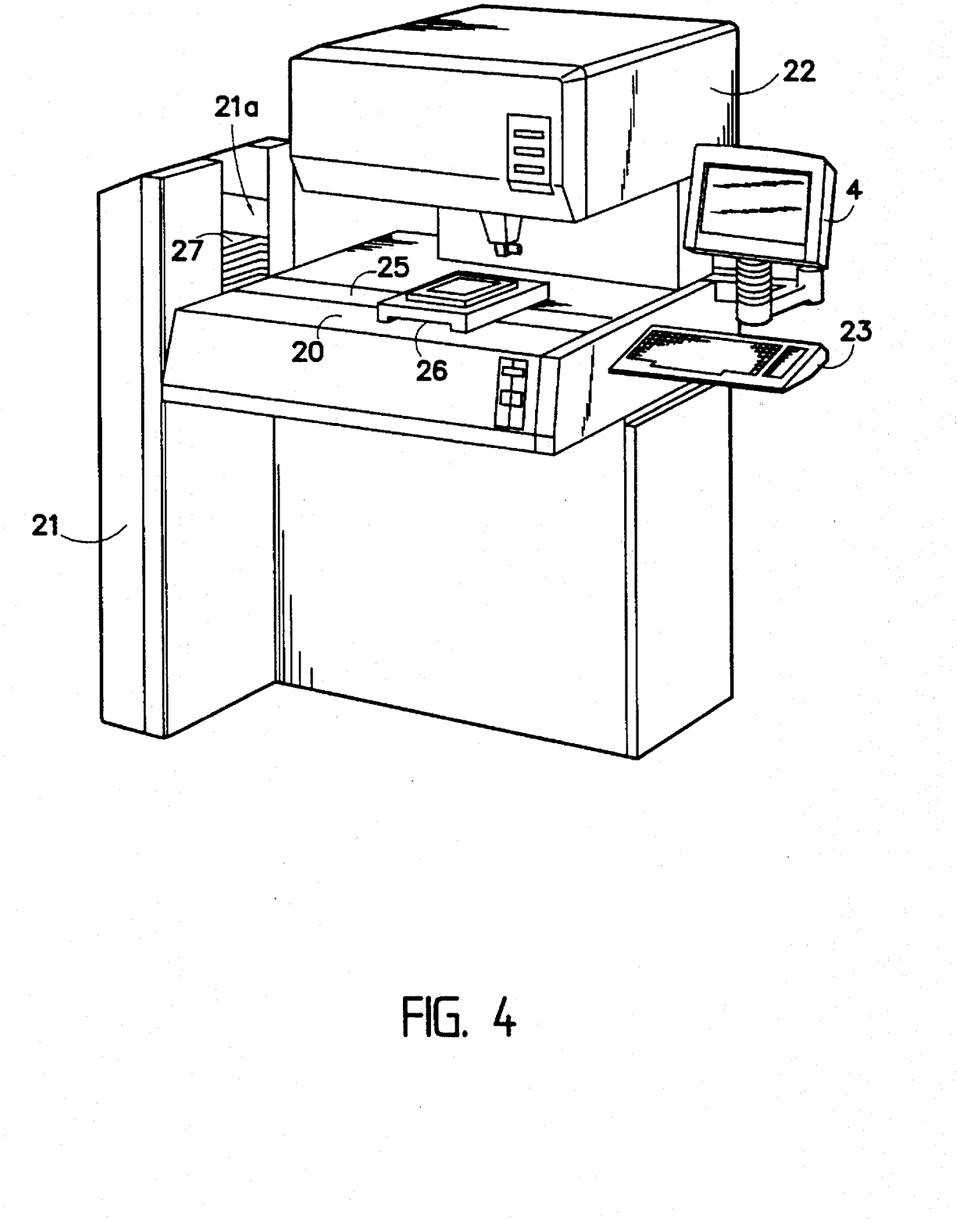
FIG. 4 is a structural diagram showing the test equipment.
Figure 5:
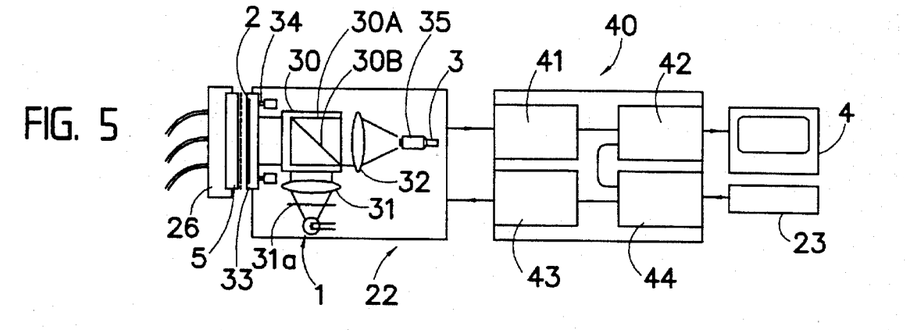
FIG. 5 is a structural diagram of the inside of the test equipment.
Figure 6:
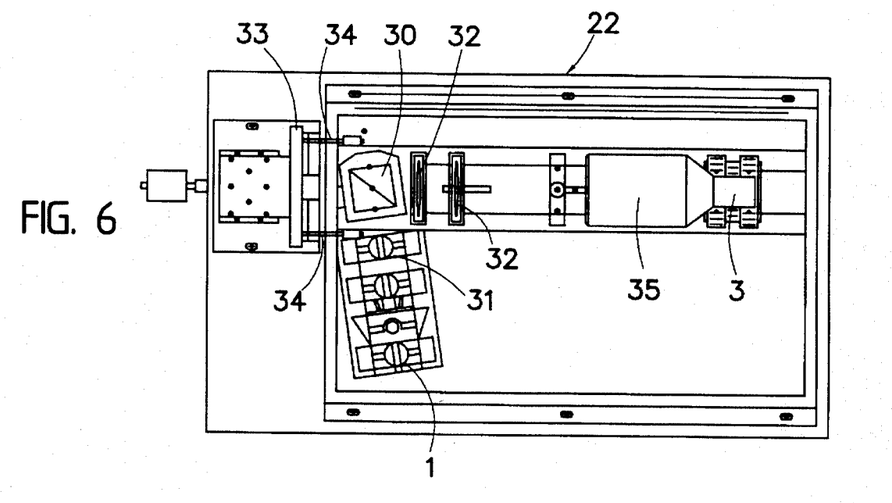
FIG. 6 is a detailed diagram of the inside of the test head of the test equipment.

The general structure of the test equipment is shown in FIG. 2. The detailed structure of the test equipment is shown in FIGS. 4, 5, and 6. These examples of the test equipment in operation show the test equipment equipped with light source 1 which emits the detection light, electro-optical element 2 on which the light is shone, light receiver 3 which receives the light reflected from electro-optical element 2, and monitor 4 which is connected to light receiver 3. The test equipment is constructed so that active matrix liquid crystal display substrate 5 can be positioned opposite electro-optical element 2.

Figure 3:
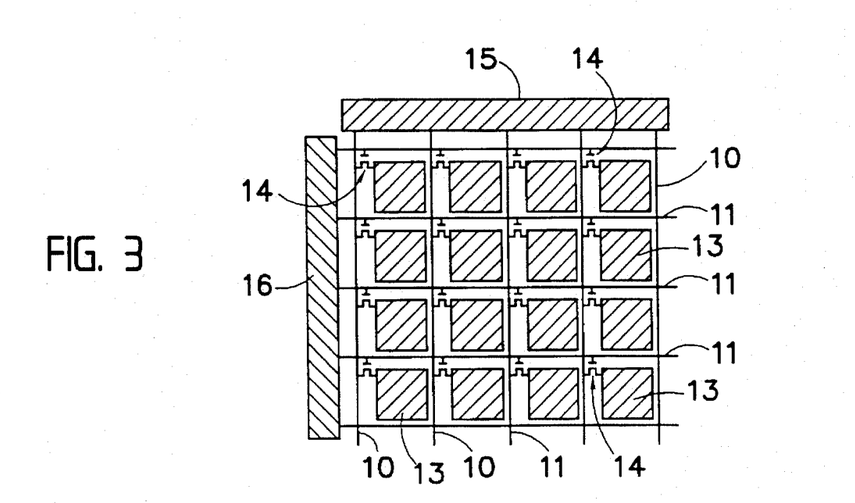
FIG. 3 is a partially expanded diagram of the elements of the active matrix liquid crystal display substrate being tested.

Active matrix liquid crystal display substrate 5 is one commonly used in liquid crystal display panels and for example, as shown in FIG. 3, is constructed of several source wires 10 to generate the flow of data signals and several gate wires 11 to allow the flow of scan signals formed on a substrate in an array state. Pixel element electrodes 13 are formed in between these, and each pixel element electrode 13 is connected to source wire 10 and gate wire 11 via a switching element 14 which is a thin film transistor.

Reference Number 15 in FIG. 3 indicates a shorting bar (short circuit electrode) connected to source wiring 10 and number 16 indicates a shorting bar (short circuit electrode) connected to gate wiring 11. Shorting bars 15 and 16, although formed during the active matrix liquid crystal substrate manufacturing stage, are removed at a later processing stage when the transparent substrate is placed on the active matrix liquid crystal display substrate after the manufacturing of active matrix liquid crystal display substrate 5. Liquid crystals are then inserted between the active matrix liquid crystal display substrate and the transparent substrate forming a liquid crystal display panel.

The aforementioned shorting bars 15 and 16 prevent static electricity from adversely affecting the thin film transistors. There are various-shaped shorting bars, but installation of a mounted driver instead of the shorting bars also can achieve the result desired.

FIGS. 4, 5 and 6 show the detailed structure of a preferred embodiment of the test equipment in operation. Shown in FIG. 4 are test bed 20, substrate holder (cassette rack) 21 at the left side of bed 20, inspection head 22, and control panel 23.

Guide rail 25 is installed in a right to left direction on the upper central portion of the bed 20. Table 26 can be moved in a right and left direction along guide rail 25. A mechanism is incorporated in the bottom of table 26 to move table 26 in a direction at right-angles to guide rail 25. Table 26 can thus be moved in right and left and forward and backward directions (in other words, X and Y directions) within a horizontal plane.

Inside substrate holder 21 is cassette 27 (See FIG. 8) which holds several active matrix liquid crystal display substrates 5. Active matrix liquid crystal display substrates 5 can be consecutively taken from the opening of cassette 27 on the top of this substrate holder 21 and placed on top of table 26.

The internal structure of inspection head 22 is shown in FIGS. 5 and 6. However, the placement status of each optical instrument in FIGS. 5 and 6 can be changed in layout depending on the set up position or direction of orientation of active matrix liquid crystal display substrate 5. An example of active matrix liquid crystal display substrate 5 set up vertically is shown in FIG. 5 and FIG. 6 for easy explanation.

As shown in FIGS. 5 and 6, light source 1 and light receiver 3 are housed inside inspection head 22 as shown in FIG. 4. Light source 1 and light receiver 3 are respectively facing the sides of beam splitter 30. Adjustment lens 31 and filter 31a are set up between beam splitter 30 and light source 1 and adjustment lens 32 is set up between beam splitter 30 and light receiver 3, respectively.

Holder 33, fitted with electro-optical element 2, is installed at the left side of beam splitter 30 in FIG. 4 and FIG. 5. Holder 33 can move in the right to left direction of FIG. 5 and FIG. 6 along support rods 34. Zoom lens 35 is fitted in front of light receiver 3 so that reflected light from electro-optical element 2 can illuminate light receiver 3.

The detection light from light source 1 is shone at a right angle to the top of electro-optical element 2, due to beam splitter 30. After being reflected by the dielectric reflective film 9 of electro-optical element 2, the light passes through beam splitter 30, lens 32, and zoom lens 35 so that it can be observed on light receiver 3.

Light source 1 in one preferred embodiment is comprised of a halogen lamp, but various kinds of laser lights also can be used in addition to halogen lamps as light source 1. When using a laser light to irradiate electro-optical element 2, fine spots of light are generated on the surface of electro-optical element 2. These spots are detected as noise. Since there is a fear that noise called speckle noise will be generated, use of a halogen lamp is preferred.

A CCD camera, or the like, can be used as light receiver 3.

Beam splitter 30 is a semi-transparent (half silvered) mirror 30B laid underneath the inside of a right-angle shaped piece of glass or other transparent body 30A. Semi-transparent (half silvered) mirror 30B is set up to be located along a diagonal line with the side of transparent body 30A.

Reference number 7 in FIG. 2 is a voltage source for impressing a fixed voltage between the thin film transparent electrode of electro-optical element 2 and active matrix liquid crystal display substrate 5. In this manner, a pulsed voltage can be impressed to the respective individual source wires and gate wires by the wiring connected to the source wiring and gate wiring. The pulse voltage, pulse width and period can be adjusted. Voltage source 7 is electrically connected to the transparent electrode on the top side of electro-optical element 2 and shorting bars 15 and 16 of the active matrix liquid crystal display substrate 5 so that it can impress voltage to all of the picture element electrodes 13 on the active matrix liquid crystal display substrate 5.

Reference number 40 in FIG. 5 shows a controller which contains an A/D converter 41 which is electrically connected to light receiver 3, image processor 42, drive circuit 43, and CPU 44. All are incorporated inside controller 40. Display 4 is connected to image processor 42, and control panel 23 is connected to CPU 44.

Controller 40 converts the intensity of the light received by light receiver 3 to an equivalent voltage. Along with displaying that strength, displays on monitor 4 display the number, position and kind of defects in active matrix liquid crystal display substrate 5 according to the magnitude of the equivalent voltage. The number of defects can be calculated by inputting the dimensions of each pixel element, masking the equivalent voltage distribution, and making a determination of the operational characteristics of each pixel element.

Figure 7:
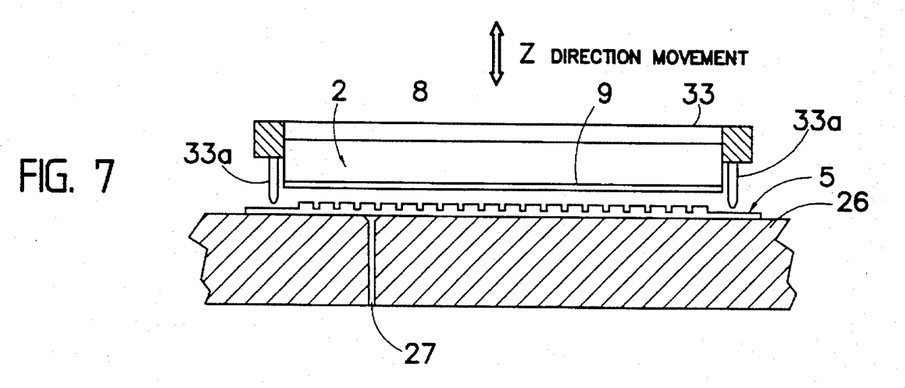
FIG. 7 is a cross-sectional view showing the positioning of the holder using the test equipment and the active matrix liquid crystal display substrate.

FIG. 7 shows active matrix liquid crystal display substrate 5 laying on top of table 26.

An air passage 27 penetrating through the top and bottom of table 26 is formed in table 26 and a flexible tube (not shown) is connected to the bottom opening of air passage 27 so that it will not inhibit the movement of table 26. This flexible tube is connected to a vacuum pump. In other words, active matrix liquid crystal display substrate 5 is placed on top of table 26, and can be affixed to the top of table 26 by drawing a vacuum via air passage 27.

Figure 8:
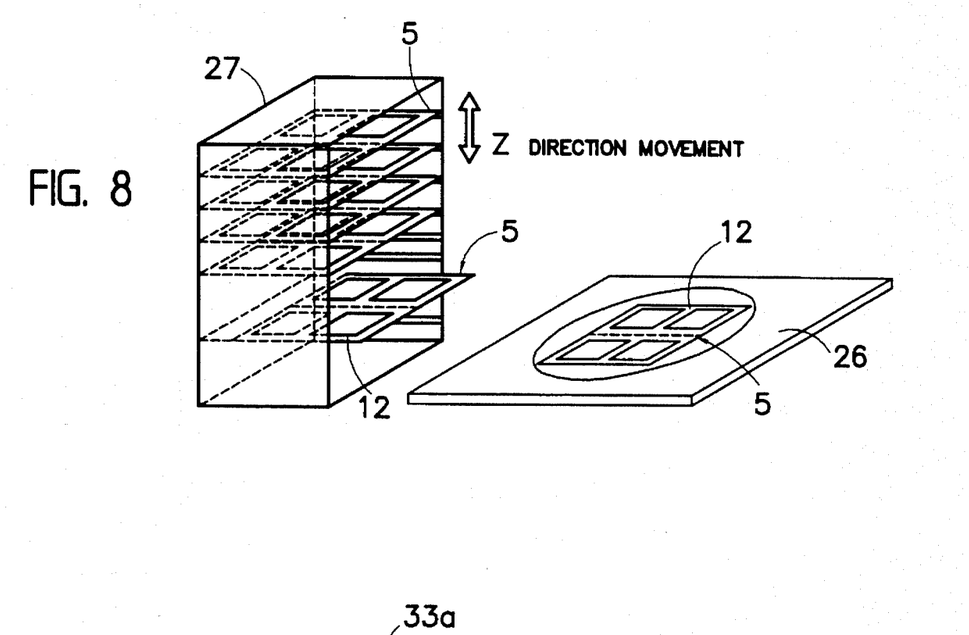
FIG. 8 shows removal of the active matrix liquid crystal display substrate from the substrate holder.
Figure 9:
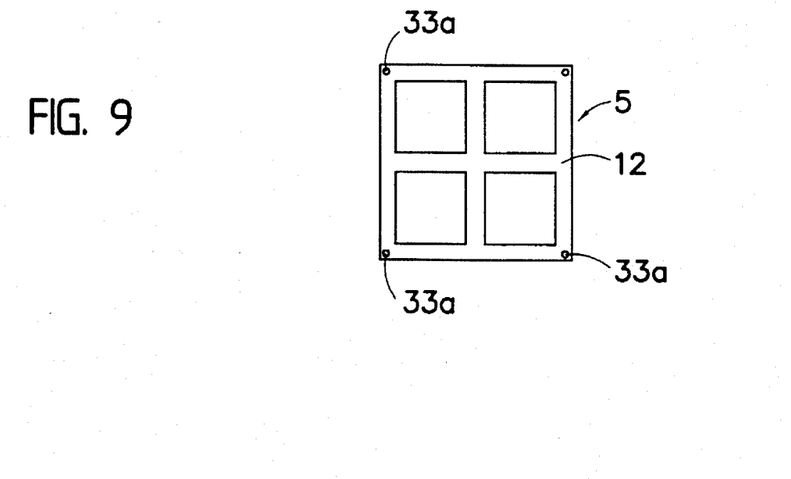
FIG. 9 is a top view of the active matrix liquid crystal display substrate.

On the active matrix liquid crystal display substrate 5 production line, the active matrix liquid crystal display substrate 5 is manufactured by forming source wiring 10, gate wiring 11, pixel element electrodes 13, switching elements 14, and shorting bars 15 and 16 on the substrate via various processes such as mask preparation, thin film preparation, resist deposition, etching, washing, and ion injection. Furthermore, as shown in FIG. 8 or FIG. 9, several (four in this example of operation) square-shaped areas forming source wiring 10, gate wiring 11, picture element electrodes 13, switching elements 14, and shorting bars 15 and 16 for this active matrix liquid crystal display substrate 5 are formed on one substrate 12.

The liquid crystal display substrate 5 manufactured is conveyed to the substrate holder 21 of the test equipment while still housed in the cassette and set.

The active matrix liquid crystal display substrate 5 housed in the substrate holder 21 is removed from substrate holder 21 and set up on ,table 26. When the active matrix liquid crystal display substrate 5 has been set up on top of table 26, the active matrix liquid crystal display substrate 5 is fixed on top of table 26 by applying a vacuum.

Next, table 26 is moved along guide rail 25 (x axis direction movement) until it faces scan head 22. Table 26 is further moved micro distances forward and back, right and left so that table 26 is accurately positioned in the prescribed position under scan head 22.

Next, holder 33 set on scan head 22 is moved and electro-optical element 2 is brought close to active matrix liquid crystal display substrate 5. At this point, the positioning pivots 33a formed around the outside of holder 33 are pushed into the prescribed position for active matrix liquid crystal display substrate 5, and position matching for positioning pivots 33a and active matrix liquid crystal display substrate 5 is made, maintaining a minute air gap. In the position matching here, as shown in FIG. 9, the positioning pivots 33a make contact with the prescribed positions in the 4 corners of substrate 12 for the active matrix liquid crystal display substrates 5 which have independently formed gate wiring, source wiring, picture element electrodes, switching elements and shorting bars respectively in multiple areas whereby multiple areas are formed on one square-shaped substrate 12, and active matrix liquid crystal display substrate 5 and electro-optical element 2 are made parallel.

The electrodes connected to voltage source 7 are then connected to shorting bars 15 and 16 of the active matrix liquid crystal display substrate 5. Then, the voltage is gradually increased so that the source side will become a positive voltage compared to the gate side, and the leakage current between source wiring 10 and gate wiring 11 is monitored using current detection methods. If leakage current is discovered, a determination is made that a source wiring 10 and gate wiring 11 short (called a cross short) exists. If there is no leakage current, the system proceeds to the next step. Active matrix liquid crystal display substrates 5 that contain a cross short are either repaired or scrapped.

Next, a bias voltage is applied between the electrode on top of the electro-optical element previously wired, and the electrode wired to the gate side 11 and source side 10. A set voltage is applied as opposed to alternating current or direct current, is impressed in the appropriate mode and amount for this bias voltage, and inspection of defects is made. Thus, an electric field is generated between the transparent electrode on top of the electro-optical element and the pixel element electrodes on active matrix liquid crystal display substrate 5. Dielectric reflective film 9, located on the bottom side of electro-optical element 2, will not affect the distribution of the electric field. If dielectric reflective film 9 is made of metal such as Al or has other conductive properties, then it will influence the distribution of the electric field used in electro-optical element 8 and will adversely affect testing accuracy. However, even if reflective film 9 is made of metal, it can be used if it is divided up on a one-to-one basis with each of the individual elements matching the pixel element electrodes.

Figure 10:
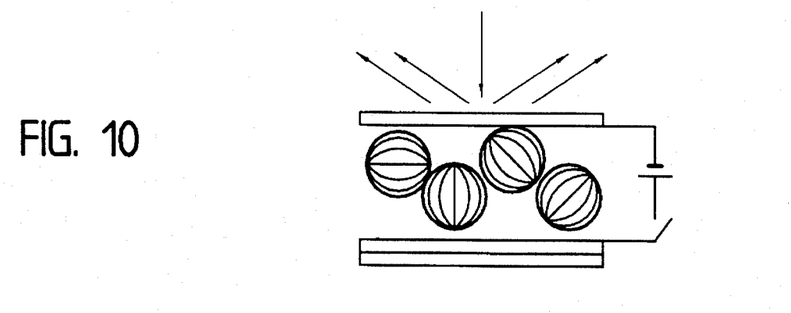
FIG. 10 is a cross-sectional view of a liquid crystal sheet with no electric field impressed.
Figure 11:
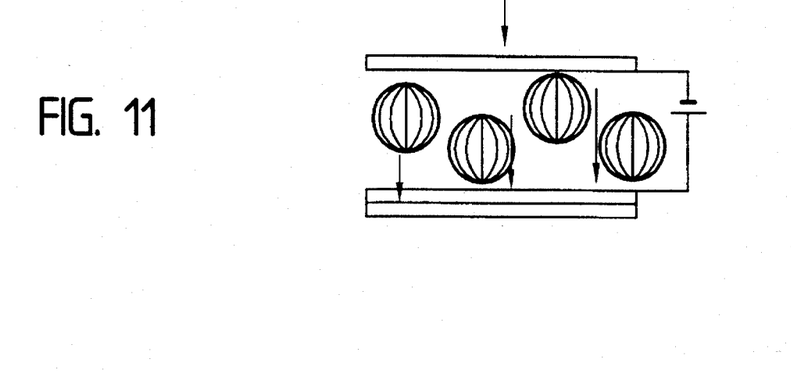
FIG. 11 is a cross-sectional view of a liquid crystal sheet with an electric field impressed.

When an electric field is not impressed across electro-optical element 8, as shown in FIG. 10, the droplet liquid crystal molecules are facing random directions and scatter the light so that the liquid crystal will not transmit light, but when an electric field is impressed, as shown in FIG. 11, the liquid crystal molecules in the droplets are aligned the same direction as the electric field so that light passes through. The liquid crystal has an area where the amount of transmitted light changes proportionally with the voltage applied across the liquid crystal. Changes in voltage can be measured as changes in the amount of transmitted light using this (linear) property. A bias voltage is impressed as the voltage for this linear region between picture element electrodes 13 and the transparent electrode of electro-optical element 2.

If the above liquid crystal is used, then electro-optical element 8 that has an electric field impressed between picture element electrodes 13 and the thin film transparent electrode on the top of electro-optical element 2 will be such that the amount of transmitted light will change in proportion to the change in electric field presented by each picture element electrode 13.

Light from light source 1 irradiates and passes through electro-optical element 8, and is reflected by dielectric reflective film 9, passes again through electro-optical element 8, and is measured by light receiver 3. The light detected by light conductor 30B is reflected at right angles to the top of electro-optical element 2. The light detected on the top of electro-optical element 2 should be transmitted perpendicularly by beam splitter 30.

Next, light receiver 3 calculates the intensity of the light received and computes the equivalent voltage in conjunction with controller 40. If the value of this equivalent voltage is specified, the equivalent voltage generated in each pixel element is checked with a threshold value, and the pixel element is judged good or bad by the brightness of the image, or equivalent voltage value. In determining whether to accept or reject active matrix liquid crystal display substrate 5, a designated standard is established. If the value of how many defects are permissible or not in a liquid crystal display element with 1,000,000 picture elements, for example, is determined, the user can judge the employment or rejection of active matrix liquid crystal display substrate 5 based on the data obtained from the processed image.

If the number of defects in active matrix liquid crystal display substrate 5 is determined to be within the permissible range, the active matrix liquid crystal display substrate 5 that has completed testing is conveyed to the next production step.

If the number of defects in active matrix liquid crystal display substrate 5 is outside the permissible range, those that can be repaired can either be sent to a repair device, or sent to cutting and deposit devices where repairs are made. After repairs have been completed, it is returned to the production line.

Those active matrix liquid crystal substrates that are considered difficult to repair are scrapped.

If testing is performed in keeping with the teachings of the present invention, test conditions close to the final inspection test will be reproduced in active matrix liquid crystal display substrate 5 before liquid crystal panel assembly, defects will be detected, and the repair of defects can be done comparatively easily since repairs will be made before liquid crystal panel assembly. This will serve to improve the in-line yield since poor quality substrates are weeded out and do not proceed to later processes.

Using the testing method of this invention, various kinds of defects can be detected while maintaining protection against the effects of static electricity in later processes where static electricity is particularly generated, such as when assembling the liquid crystal panels.

Testing is also possible for those active matrix liquid crystal display substrates that have an integrated circuit (IC) driver attached instead of shorting bars (short circuit electrodes) 15 and 16, or those that have a drive circuit attached, or in active matrix liquid crystal display substrates that have a drive circuit or active matrix liquid crystal display substrates that do not have a short circuit electrode.

An additional advantage is that electro-optical element 2 can be set up without being restricted to the dimensions of the picture element electrode on the active matrix liquid crystal display substrate that is the subject of inspection. Its universality and reliability are high, and production costs are inexpensive.

If testing of the active matrix liquid crystal display substrate 5 is made using electro-optical element 2 as described herein, testing of active matrix liquid crystal display substrates can be done very simply since the position, number, and kinds of defects in active matrix liquid crystal display substrates can be indicated electrically.

Furthermore, since defects are judged by block conversion of reflected light from electro-optical element 2 to an equivalent voltage, testing in a short time is possible. For example, the inventors of this application used an inspection device that was actually trial-manufactured using a liquid crystal sheet as the electro-optical element. In conducting tests of 10-inch active matrix liquid crystal display substrates, the inventors were able to conduct tests (including mechanical alignment speed) handling active matrix liquid crystal display substrates 5 at a rate of over 12 per hour with the resolution of the liquid crystal sheet of under 50 micrometers.

The liquid crystal sheet used as electro-optical element 8 in one exemplary preferred embodiment has liquid crystal enclosed in a housing made of transparent sheets which can neither be heated to high temperatures nor installed in a vacuum. For these reasons, it cannot be formed by thin film formation methods such as evaporating the transparent electrode and dielectric reflective film on the two sides of a liquid crystal sheet. Consequently, the manufacture of the electro-optical element 8 with the aforementioned structure is conducted by the following method.

Figure 12:
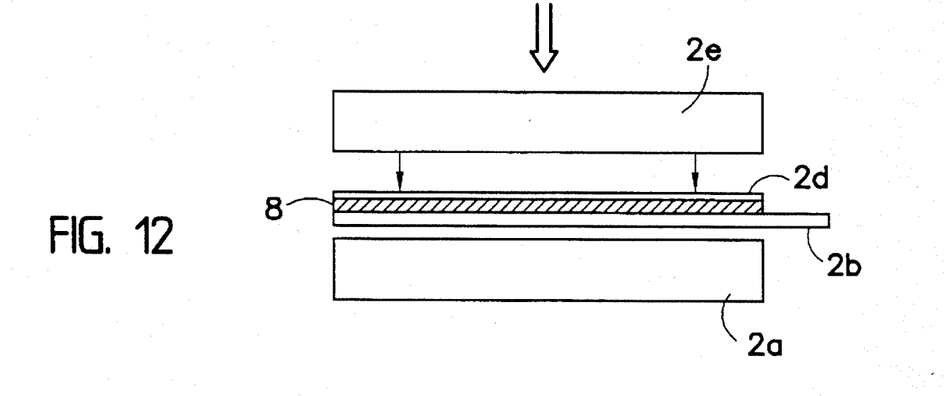
FIG. 12 is a cross-sectional view showing the first step in the manufacturing of the electro-optical element.
Figure 13:
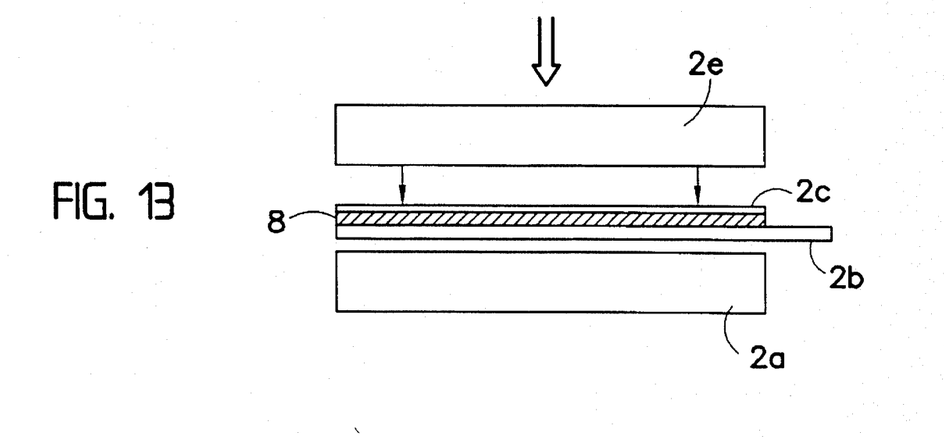
FIG. 13 is a cross-sectional diagram showing the second step in the manufacturing of the electro-optical element.

As shown in FIG. 12, preparation is made to affix transparent sheets 2b and 2d, comprised of polyethylene terephthalate, or the like, to both sides of electro-optical element 8. A transparent electrode (such as a film of indium trioxide) is applied to the entire surface of transparent sheet 2b on the electro-optical element 8 side. Electro-optical element 8 is flexible with a thickness of about 20 micrometers. Since it is easily damaged, transparent sheets 2b and 2d are affixed in order to protect the easily-damaged electro-optical element 8.

Next, as shown in FIG. 12, transparent sheet 2b which is affixed to electro-optical element 8 is adhered with a transparent optical adhesive to the top of transparent supporting substrate 2a. A material that has favorable light transmission characteristics, is transparent, has little unevenness, and little dust is used for the optical adhesive. In adhering transparent sheet 2b uniformly to transparent supporting substrate 2a, as shown in FIG. 12, a flat weight 2e such as a glass plate with uniform thickness is placed on top of transparent sheet 2d applying uniform force until the adhesive hardens.

Figure 14:
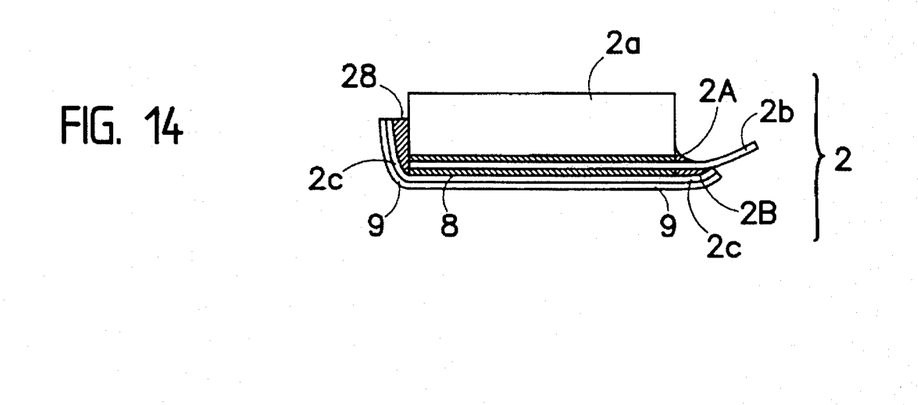
FIG. 14 is a cross-sectional diagram showing the third step in the manufacturing of the electro-optical element.

When the adhesive hardens, weight 2e is removed, transparent sheet 2d is peeled off and removed and only transparent sheet 2b is affixed to electro-optical element 8, transparent film 2c with a thickness of about 2 micrometers which provides dielectric reflective film 9 is affixed in place of transparent sheet 2d. Here, along with placing aforementioned weight 2e on top of transparent film 2c to supply uniform force, electro-optical element 2 is completed, uniting adhered layers 2A and 2B, as shown in FIG. 14, by adhering the edges around transparent film 2c to the edges around electro-optical element 8 using an adhesive. Here, it is possible to affix transparent film 2c easily on top of electro-optical element 8 because it has adhesive properties.

Figure 15:
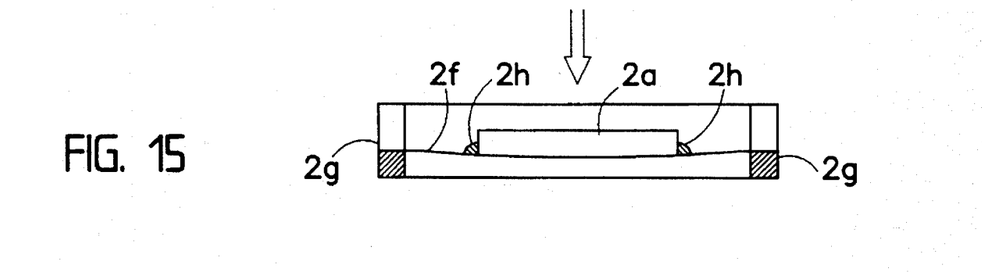
FIG. 15 is a cross-sectional side view showing the electro-optical element installed on top of the transparent film.

The preferred method to affix electro-optical element 8 uniformly to transparent film 2c is shown in FIG. 15. First, a transparent film 2f is prepared which is considerably larger than transparent substrate 2a. This transparent film 2f is supported horizontally by ring-shaped support frame 2g. Next, transparent sheet 2b and electro-optical element 8 that have been adhered to transparent substrate 2a are placed on top of the center of transparent film 2f. A uniform weight is then placed on top of transparent substrate 2a and adhesive 2h is applied around transparent substrate 2a. Thus, transparent film 2f is affixed to electro-optical element 8. When transparent film 2f has been completely affixed and the adhesive has hardened, transparent film 2f is cut along the perimeter of transparent substrate 2a.

Figure 16:
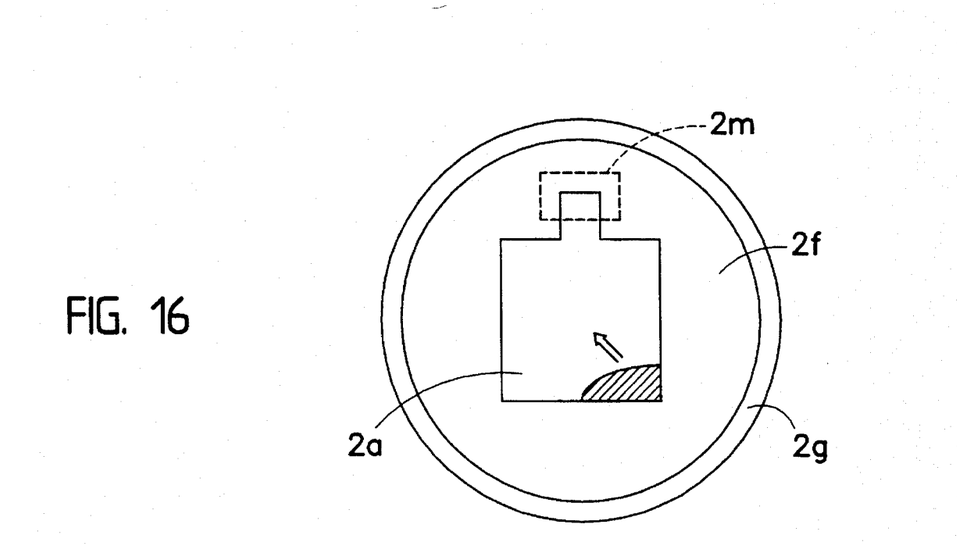
FIG. 16 shows the method for affixing the electro-optical element.
Figure 17:
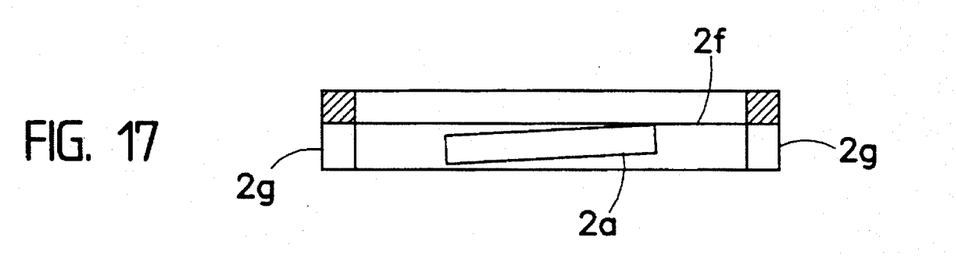
FIG. 17 is a side view showing the method used to affix a transparent sheet to the electro-optical element.

Assembly as shown in FIGS. 16 and 17 is used to affix transparent film 2f to electro-optical element 8 as shown in FIG. 15. First, the top and bottom of support frame 2g are inverted, as shown in FIG. 17, and transparent film 2f is supported horizontally. Transparent sheet 2b is prepared by forming tab 2i on part of the periphery of transparent sheet 2b. Next, the stacked transparent substrate 2a, transparent sheet 2b, and electro-optical element 8 are brought close to transparent film 2f from underneath, and gradually affixed to transparent sheet 2f from the tab 2i side and opposite side. Care must be used in the affixing operation so that air bubbles will not be formed between transparent film 2f and electro-optical element 8.

It is possible to ensure that air bubbles will not form between transparent sheet 2f and electro-optical element 8 by affixing them obliquely in this manner. When they have been completely attached, apply adhesive 2h as explained previously. The configuration shown in FIG. 15 is possible by inverting the top and bottom of support form 2g.

Transparent sheet 2f and electro-optical element 8 should be affixed after inserting spacer 2m, as shown by the dotted line in FIG. 2f between the tab 2i and transparent film 2f. If this is done, electro-optical element 8 can be easily be peeled off transparent sheet 2f and reaffixed even if air bubbles are trapped between transparent sheet 2f and electro-optical element 8 during assembly.

It is possible to make dielectric reflective film 9 by layering two kinds of glass according to the Zorgel method. The Zorgel method enables the creation of glass film at room temperature. A chemical synthesis of liquid glasses with a different index of refraction such as silicon trioxide, $SiO_3$, or titanium trioxide, $TiO_3$, is possible and these will harden at room temperature.

The substrate on which the dielectric reflective film is to be generated is rotated at a rate of several thousand revolutions per minute. When liquid glass with a low refractive index is placed on top in minute amounts using a pipet, a thin film with a low refractive index is created. Similarly, a thin film with a high refractive index is made on top of it by applying a liquid glass with a high refractive index. A multi-layer film is produced by alternately repeating this operation. The thickness of each thin film layer can be adjusted by the speed of rotation and amount of liquid glass applied. A highly reflective film can be obtained by establishing a thickness that is ¼ of the wavelength to be reflected.

A glass thin film with a low refractive index or a high refractive index can be manufactured at room temperature using this method. Since a vacuum is not necessary, applications are possible of Pockels crystal with a low melting point or a liquid crystal sheet that cannot be used in a vacuum as the electro-optical element 8.

However, the inspection device for the aforementioned liquid crystal display substrate was explained as a device for inspecting active matrix liquid crystal display substrates, but in addition, it also can be used for inspection of liquid crystal display substrates with a simple matrix structure, of course, and for various kinds of IC substrates, plasma displays, or electro-luminescence.

The electro-optical element of this invention provides a transparent supporting substrate, transparent electrode and dielectric reflective film. Since it is possible for the light that goes through the electro-optical element to be reflected by the dielectric reflective film, the electro-optical element can be used to measure changes in the electric field within the electro-optical element as changes in light properties.

The electro-optical element with the aforementioned structure is installed on top of the active matrix liquid crystal display substrate to be tested. Electricity is applied to the pixel electrodes of the active matrix liquid crystal display substrate and transparent electrode of the electro-optical element. The optical properties of the electro-optical element change and the change in the strength of the light transmitted through the electro-optical element is captured by a light receiver. Detection of defects in the active matrix liquid crystal display substrate can be detected by comparison with a known good substrate. In other words, defects in the active matrix liquid crystal display substrate can be detected electrically by the detection output of light which allows accurate and rapid testing.

Since the electro-optical element cannot be manufactured in a high-temperature or vacuum atmosphere, it is impossible to form a transparent electrode and a dielectric reflective film directly connected to the electro-optical element by usual thin film formation techniques such as evaporation or sputtering. Therefore, a transparent electrode and dielectric reflective film must be affixed to the electro-optical element by first affixing a transparent sheet and transparent film of polyethylene terephthalate, or the like, then affixing the transparent electrode and dielectric reflective film to the electro-optical element.

What is claimed:

1. An electro-optical element which possesses properties which change when an electric field is impressed across it, said electro-optical element comprising an electro-optical layer comprising a top surface, a bottom surface, and an electro-optical layer edge a dielectric reflective film overlying said bottom surface of said electro-optical layer, a transparent electrode overlying said top surface of said electro-optical layer, transparent supporting substrate overlying said transparent electrode, said transparent supporting substrate including an edge portion, and an adhesive layer formed overlying said electro-optical layer edge and said edge portion of transparent supporting substrate, wherein said adhesive layer affixes said electro-optical layer with said transparent supporting substrate.

2. A partially completed electro-optical element comprising:

electro-optical material comprising a top surface, a bottom surface, and an edge;

a transparent sheet comprising a first transparent sheet side and a second transparent sheet side, said transparent sheet being coated with a transparent electrode on said first transparent sheet side, said transparent electrode overlying said top surface of said electro-optical material;

a transparent film with a dielectric reflective film on one side thereof, said transparent film comprising an other side, said other side overlying said bottom surface of said electro-optical element;

a transparent supporting substrate comprising a substrate edge overlying said second transparent sheet side, said transparent film being larger than the transparent supporting substrate, and said transparent supporting substrate being within a perimeter of said transparent film; and an adhesive film applied between said edge of said electro-optical material, said substrate edge, and a portion of said transparent film.

3. The electro-optical element as described in claim 2 in which said transparent conductive layer is a layer of indium trioxide.

4. The electro-optical element as described in claim 2 in which said reflective film is comprised of a plurality of layers of material alternately composed of a low refractive index material, and a high refractive index material.

5. The electro-optical element as described in claim 2 in which said reflective layer is further comprised of an electrically conductive material, and divided into individual segments, each segment corresponding to a single segment or pixel of the device to be tested.

6. The electro-optical element as described in claim 2 in which the electro-optical material between said first transparent sheet and said second transparent sheet does not contain any voids or bubbles.

7. The electro-optical element as described in claim 2 in which said electro-optical material located between said first transparent sheet and said second transparent sheet is comprised of Pockels crystalline material.

8. The electro-optical element as described in claim 2 in which the electro-optical material located between said first transparent film and said second transparent film is further comprised of nematic curvilinear aligned phase (NCAP) material.

9. The electro-optical element as described in claim 2 in which said first transparent film is further comprised of a polyethylene terephthalate film.

10. The electro-optical element as described in claim 2 in which said second transparent film is further comprised of a polyethylene terephthalate film.

11. An electro-optical element comprising:

a first transparent sheet having first and second sides;

a transparent conductive layer located on said second side of said transparent sheet;

an electro-optical element material whose optical properties with respect to light transmisivity change when an electric field is applied across the electro-optical material located on said first side of said first transparent sheet;

a second transparent sheet having first and second sides, said first side of said second transparent sheet being placed adjacent to said electro-optical material, said first side of said second transparent sheet facing said first side of said first transparent sheet, and separated from said first transparent sheet by said electro-optical material, said electro-optical material effectively encapsulated between said first transparent sheet and said second transparent sheet;

a reflective film located on said second side of said second transparent sheet;

said first transparent sheet and said second transparent sheet bonded together along the edges thereof by an adhesive, said first transparent sheet and said second transparent sheet free from said adhesive at surfaces thereof.

12. The electro-optical element as described in claim 11 in which said transparent conductive layer is a layer of indium trioxide.

13. The electro-optical element as described in claim 11 in which said reflective film is comprised of a plurality of layers of material alternately composed of a low refractive index material, and a high refractive index material.

14. The electro-optical element as described in claim 11 in which the electro-optical element is a thin, planar element.

15. The electro-optical element as described in claim 11 in which said reflective layer is further comprised of an electrically conductive material, and divided into individual segments, each segment corresponding to a single segment or pixel of the device to be tested.

16. The electro-optical element as described in claim 11 in which the electro-optical material between said first transparent sheet and said second transparent sheet does not contain any voids or bubbles.

17. The electro-optical element as described in claim 11 in which said electro-optical material located between said first transparent sheet and said second transparent sheet is comprised of Pockels crystalline material.

18. The electro-optical element as described in claim 11 in which the electro-optical material located between said first transparent film and said second transparent film is further comprised of nematic curvilinear aligned phase (NCAP) material.

19. The electro-optical element as described in claim 11 in which said first transparent Sheet is further comprised of a polyethylene terephthalate film.

20. The electro-optical element as described in claim 11 in which said second transparent sheet is further comprised of a polyethylene terephthalate film.

21. A method of forming an electro-optic element comprising the steps of:

provㄹiding a first sheet comprising a first inner face and a first outer face, and a second sheet comprising a second inner face and a second outer face;

applying an electrode overlying said first inner face;

affixing an electro-optical layer between said second inner face and said electrode overlying said first inner face; and adhering said first outer face to a supporting substrate.

22. The method of claim 21 wherein said adhering step occurs with an optical adhesive having light transmission characteristics and being free from particles.

23. The method of claim 22 wherein said adhering step comprise applying uniform force onto said electro-optical element until said optical adhesive hardens.

24. The method of claim 23 further comprising a step of removing said second sheet from said electro-optical material.

25. The method of claim 24 further comprising a step of affixing a dielectric film overlying said electro-optical material.

26. The method of claim 25 wherein said dielectric film is a liquid glass selected from a group consisting of silicon trioxide or titanium trioxide.

27. The method of claim 25 wherein said dielectric film comprise a first thin film with a refractive index and a second thin film with a refractive index higher than that of the first thin film.

28. The method of claim 25 wherein said affixing step occurs with an optical adhesive having light transmission characteristics and free from particles.

29. The method of claim 29 wherein said step of affixing further comprise applying a uniform force onto said electro-optical material until said optical adhesive hardens.

30. The method of claim 25 wherein said dielectric film adheres to edges around said electro-optical element with said adhesive.

31. The method of claim 35 wherein said dielectric film comprise a reflective material.

32. The method of claim 31 wherein said dielectric film comprise a thickness of about 2 micrometers.

33. The method of claim 21 wherein said first and said second sheet comprise polyethylene terephthalate.

34. The method of claim 21 wherein said electrode comprise indium trioxide.

35. The method of claim 21 wherein said electro-optical layer includes a thickness of about 20 micrometers.

36. The method of claim 21 wherein said electro-optical material comprises Nematic Curvilinear Aligned Phase sheets.

37. The method of claim 27 wherein said electro-optical material comprises Pockel crystals.

* * * * *